United States Patent
Park et al.

(10) Patent No.: US 11,563,213 B2
(45) Date of Patent: Jan. 24, 2023

(54) METHOD OF PREPARING POSITIVE ELECTRODE ACTIVE MATERIAL FOR LITHIUM SECONDARY BATTERY, POSITIVE ELECTRODE ACTIVE MATERIAL PREPARED THEREBY, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

(71) Applicant: LG Chem, Ltd., Seoul (KR)

(72) Inventors: Sung Soon Park, Daejeon (KR); Dong Joon Ahn, Daejeon (KR); Moon Kyu Cho, Daejeon (KR)

(73) Assignee: LG Chem, Ltd.

(*) Notice: Subject to any disclaimer, the term of this patent is extended or adjusted under 35 U.S.C. 154(b) by 411 days.

(21) Appl. No.: 16/485,730

(22) PCT Filed: Sep. 27, 2018

(86) PCT No.: PCT/KR2018/011447
§ 371 (c)(1),
(2) Date: Aug. 13, 2019

(87) PCT Pub. No.: WO2019/078506
PCT Pub. Date: Apr. 25, 2019

(65) Prior Publication Data
US 2020/0259176 A1    Aug. 13, 2020

(30) Foreign Application Priority Data
Oct. 20, 2017  (KR) .................. 10-2017-0136889

(51) Int. Cl.
| | | |
|---|---|---|
| H01M 4/525 | (2010.01) | |
| H01M 4/62 | (2006.01) | |
| H01M 4/04 | (2006.01) | |
| H01M 10/0525 | (2010.01) | |
| C01G 53/00 | (2006.01) | |
| H01M 4/02 | (2006.01) | |

(52) U.S. Cl.
CPC ............ *H01M 4/525* (2013.01); *C01G 53/50* (2013.01); *H01M 4/0471* (2013.01); *H01M 4/623* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | |
|---|---|---|
| 3,915,549 A | 10/1975 | Amodei et al. |
| 2006/0083988 A1 | 4/2006 | Deguchi et al. |
| 2013/0344386 A1 | 12/2013 | Kim et al. |
| 2015/0147655 A1 | 5/2015 | Park et al. |
| 2015/0270537 A1 | 9/2015 | Kato et al. |
| 2016/0293952 A1 | 10/2016 | Kaneda et al. |
| 2017/0179544 A1 | 6/2017 | Lin et al. |
| 2019/0051899 A1 | 2/2019 | Xia et al. |
| 2019/0115596 A1 | 4/2019 | Kajiyama et al. |

FOREIGN PATENT DOCUMENTS

| | | |
|---|---|---|
| CN | 104934586 A | 9/2015 |
| CN | 105070907 A | 11/2015 |
| CN | 105765770 A | 7/2016 |
| CN | 106505193 A | 3/2017 |
| CN | 106654222 A | 5/2017 |
| EP | 1734607 A1 | 12/2006 |
| JP | 2015122299 A | 7/2015 |
| JP | 2016024879 A | 2/2016 |
| JP | 2017084673 A | 5/2017 |
| JP | 2017084674 A | 5/2017 |
| JP | 2017117781 A | 6/2017 |
| JP | 2017188428 A | 10/2017 |
| KR | 20150026864 A | 3/2015 |
| KR | 20150042610 A | 4/2015 |
| KR | 20160146145 A | 12/2016 |
| WO | 2017051338 A1 | 3/2017 |

OTHER PUBLICATIONS

International Search Report for Application No. PCT/KR2018/0011447, dated Apr. 12, 2019, pp. 1-2.
Fu, et al., Enhanced Electrochemical Performance of LiNi0.6Co0.2Mn0.2O2 Cathode at High Cutoff Voltage by Modifying Electrode/Electrolyte Interface with Lithium Metasilicate, Eleclrochimica Acta, available online Jun. 2017, pp. 27-34, vol. 246.
Chinese Search Report for Application No. 201880010623.3 dated Apr. 30, 2021, pp. 1-3.
Janani, N. et al., "Influence of sintering additives on densification and Li+ conductivity of Al doped Li7La3Zr2O12 lithium garnet", RSC Advances, Dec. 2014, pp. 51228-51238, vol. 4, The Royal Society of Chemistry.
Extended European Search Report with Written Opinion for Application No. 18868327.0 dated Dec. 16, 2019, 6 pages.

*Primary Examiner* — Carlos Barcena
(74) *Attorney, Agent, or Firm* — Lerner, David, Littenberg, Krumholz & Mentlik, LLP

(57) ABSTRACT

In one embodiment, the present disclosure relates to a method of preparing a positive electrode active material, which includes mixing a nickel cobalt manganese hydroxide precursor containing nickel in an amount of 60 mol % or more based on a total number of moles of transition metals in the precursor, a lithium-containing raw material, and a doping raw material represented by Formula 2 (set forth herein), and sintering the mixture to prepare a positive electrode active material represented by Formula 1 (set forth herein).

5 Claims, 1 Drawing Sheet

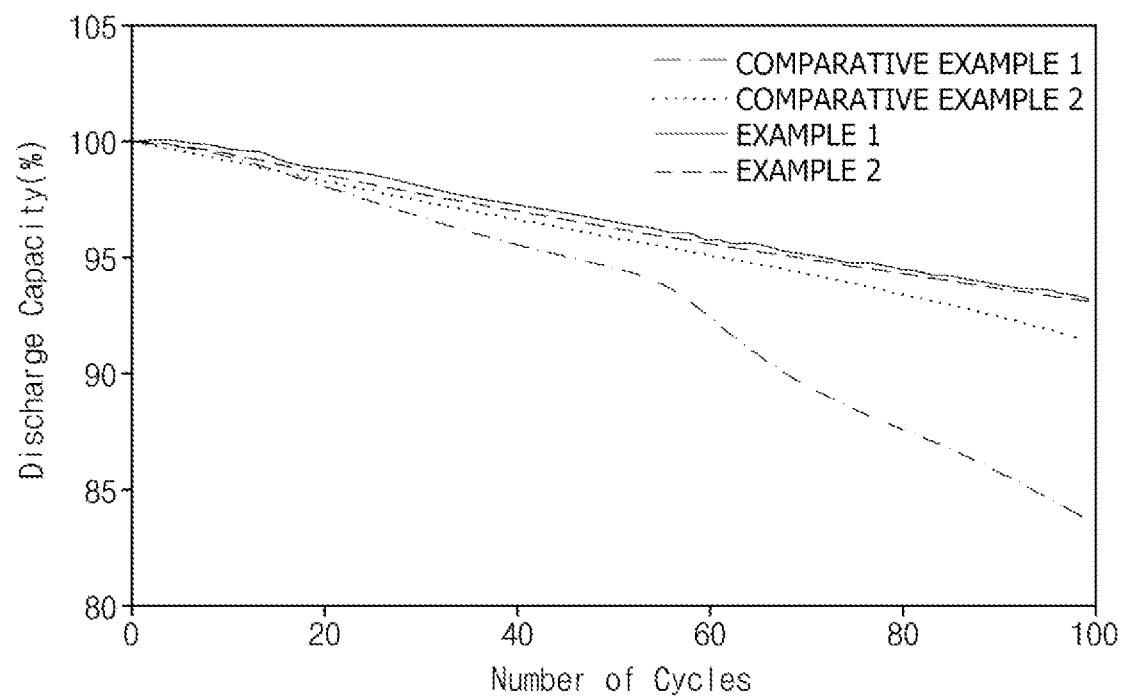

METHOD OF PREPARING POSITIVE ELECTRODE ACTIVE MATERIAL FOR LITHIUM SECONDARY BATTERY, POSITIVE ELECTRODE ACTIVE MATERIAL PREPARED THEREBY, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

CROSS-REFERENCE TO RELATED APPLICATIONS

The present application is a national phase entry under 35 U.S.C. § 371 of International Application No. PCT/KR2018/011447 filed Sep. 27, 2018, the disclosure of which is incorporated herein in its entirety by reference, which claims priority to Korean Patent Application No. 2017-0136889, filed on Oct. 20, 2017, in the Korean Intellectual Property Office, the disclosure of which is incorporated herein in its entirety by reference.

TECHNICAL FIELD

The present invention relates to a method of preparing a positive electrode active material for a lithium secondary battery, a positive electrode active material prepared thereby, a positive electrode for a lithium secondary battery including the positive electrode active material, and a lithium secondary battery including the positive electrode.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, the $LiCoO_2$ has very poor thermal properties due to an unstable crystal structure caused by lithium deintercalation. Also, since the $LiCoO_2$ is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium nickel cobalt manganese oxide, in which a portion of nickel (Ni) is substituted with manganese (Mn) and cobalt (Co), has been developed.

However, with respect to the lithium nickel cobalt manganese oxide, structural stability and capacity are low, and there is a limitation in that the structural stability is further reduced particularly when the amount of nickel is increased to increase capacity characteristics.

Thus, there is a need to develop a positive electrode active material which includes a lithium nickel cobalt manganese oxide having a high Ni content that exhibits high capacity characteristics, wherein a high capacity and long life battery may be prepared due to excellent structural stability of the lithium nickel cobalt manganese oxide.

DISCLOSURE OF THE INVENTION

Technical Problem

An aspect of the present invention provides a method of preparing a positive electrode active material which includes a transition metal oxide having a high Ni content, wherein structural stability may be improved by doping the transition metal oxide with a compound represented by $Li_{1+x}M^2O_{2+y}$ even if it is used in a high capacity battery.

Another aspect of the present invention provides a positive electrode active material prepared by the above method of preparing a positive electrode active material.

Another aspect of the present invention provides a positive electrode for a lithium secondary battery including the positive electrode active material.

Another aspect of the present invention provides a lithium secondary battery including the positive electrode for a lithium secondary battery.

Technical Solution

According to an aspect of the present invention, there is provided a method of preparing a positive electrode active material which includes: mixing a nickel cobalt manganese hydroxide precursor containing nickel in an amount of 60 mol % or more based on a total number of moles of transition metals in the precursor, a lithium-containing raw material, and a compound represented by Formula 2 as a doping raw material; and sintering the mixture to prepare a positive electrode active material represented by Formula 1:

$$Li_{1+x}[Ni_aMe_{1-(a+b)}M^1{}_b]_{1-x}O_2 \quad \text{[Formula 1]}$$

$$Li_{1+x1}M^2O_{2+y} \quad \text{[Formula 2]}$$

wherein, in Formula 1, 0≤x≤0.1, 0.6≤a≤0.9995, 0.0005≤b≤0.02, 0.6005≤a+b<1, Me includes at least two selected from the group consisting of cobalt (Co), manganese (Mn), and aluminum (Al), and $M^1$ includes at least one selected from the group consisting of lithium (Li), zirconium (Zr), titanium (Ti), tantalum (Ta), silicon (Si), and niobium (Nb), and wherein, in Formula 2, 0≤x≤17, 1≤y<6, and $M^2$ includes at least one selected from the group consisting of Li, Zr, Ti, Ta, Si, and Nb.

According to another aspect of the present invention, there is provided a positive electrode active material prepared by the method of preparing a positive electrode active material.

According to another aspect of the present invention, there is provided a positive electrode for a lithium secondary battery which includes the positive electrode active material according to the present invention.

According to another aspect of the present invention, there is provided a lithium secondary battery including the positive electrode according to the present invention.

Advantageous Effects

According to the present invention, provided is a positive electrode active material in which structural stability may be improved, even if it is used in a high capacity battery, by doping a transition metal oxide having a high Ni content with a compound represented by $Li_{1+x}M^2O_{2+y}$ (where $0 \le x \le 17$, $1 \le y < 6$, and $M^2$ includes at least one selected from the group consisting of lithium (Li), zirconium (Zr), titanium (Ti), tantalum (Ta), silicon (Si), and niobium (Nb)).

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a graph illustrating capacity retentions at a high temperature of lithium secondary batteries prepared in Examples 1 and 2 and Comparative Examples 1 and 2.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

With respect to a lithium nickel cobalt manganese oxide used as a positive electrode active material for a conventional lithium secondary battery, structural stability of the positive electrode active material is low, and there is a limitation in that the structural stability of the positive electrode active material is further reduced particularly when the lithium nickel cobalt manganese oxide includes a large amount of nickel to prepare a high capacity battery.

In order to compensate for this, research to improve the structural stability by doping the positive electrode active material with a metallic element or metal oxide has been actively conducted. However, in a case in which the positive electrode active material is doped with the metallic element as a doping raw material, since a coating layer must be accompanied due to limitations to the improvement of the structural stability, and, accordingly, there is a limitation in that unit price is increased and energy density is reduced. Also, in a case in which the positive electrode active material is doped with the metal oxide as a doping raw material, since the metal oxide and lithium in the positive electrode active material react to form a lithium depletion layer on a surface of the positive electrode active material, there is a limitation in that the structural stability is further reduced.

Thus, the present inventors found that a positive electrode active material may be prepared in which structural stability may be improved by doping a lithium nickel cobalt manganese oxide with a compound represented by $Li_{1+x}M^2O_{2+y}$ even if a coating layer is not separately formed, thereby leading to the completion of the present invention.

A method of preparing a positive electrode active material according to the present invention includes: mixing a nickel cobalt manganese hydroxide precursor containing nickel in an amount of 60 mol % or more based on a total number of moles of transition metals in the precursor, a lithium-containing raw material, and a compound represented by $Li_{1+x}M^2O_{2+y}$; and sintering the mixture to prepare a $Li_{1+x}M^2O_{2+y}$-doped positive electrode active material.

In order to prepare a positive electrode active material according to the present invention, a nickel cobalt manganese hydroxide precursor, a lithium-containing raw material, and a compound represented by Formula 2 are first mixed.

The nickel cobalt manganese hydroxide precursor may include nickel in an amount of 60 mol % or more based on a total number of moles of transition metals in the precursor, and may specifically be $Ni_{a1}Co_{b1}Mn_{c1}(OH)_2$ (where $0.6 \le a1 \le 0.95$, $0 < b1 \le 0.2$, and $0 < c1 \le 0.2$). Preferably, the nickel cobalt manganese hydroxide precursor may be at least one selected from the group consisting of $Ni_{0.6}Co_{0.2}Mn_{0.2}(OH)_2$, $Ni_{0.8}Co_{0.1}Mn_{0.1}(OH)_2$, and $Ni_{0.9}Co_{0.05}Mn_{0.05}(OH)_2$. In a case in which the amount of the nickel is 60 mol % or more based on a total number of moles of the precursor for a positive electrode active material as described above, long life and thermal stability of a battery may be achieved when the battery is prepared by using the precursor.

Also, the doping raw material includes the compound represented by Formula 2 below:

$$Li_{1+x1}M^2O_{2+y} \qquad \text{[Formula 2]}$$

in Formula 2, $0 \le x1 \le 7$, $1 \le y < 6$, and $M^2$ includes at least one selected from the group consisting of lithium (Li), zirconium (Zr), titanium (Ti), tantalum (Ta), silicon (Si), and niobium (Nb).

In a case in which the lithium-containing metal oxide of Formula 2 is included as the doping raw material, since the structural stability of the positive electrode active material is improved even if a large amount of the nickel is included to prepare a large capacity positive electrode active material, life characteristics at high temperatures are improved, and, accordingly, output characteristics and life characteristics may be improved when used in the battery.

In a case in which the compound represented by Formula 2, specifically, the lithium-containing metal oxide is included as the doping raw material as in the present invention, the lithium-containing metal oxide may be mostly located at lithium ion sites by moving with lithium ions diffusing into a lithium layer, and, due to the resulting high diffusivity, diffusion of the doping material may easily occur at a lower temperature than when the metal oxide is typically included as a doping material. Accordingly, the positive electrode active material may be more uniformly doped with the lithium-containing metal oxide. Particularly, since the lithium-containing metal oxide has a low melting onset point, the diffusivity of the lithium-containing metal oxide may be maximized particularly at a low temperature. Accordingly, since the structural stability of the positive electrode active material is improved and the reaction of the lithium in the positive electrode active material with the doping raw material does not occur, the formation of the lithium depletion layer may be prevented to prevent swelling characteristic of an electrode in advance.

The compound represented by Formula 2 may preferably include at least one selected from the group consisting of $Li_2ZrO_3$, $Li_6Zr_2O_7$, $Li\,ZrO_6$, $LiTiO_3$, $LiTaO_3$, $Li_2Si_5O_7$, $Li_2Si_5O_7$, and $LiNbO_3$.

Also, the lithium-containing raw material is not particularly limited as long as it is a compound including a lithium source, but, preferably, at least one selected from the group consisting of lithium carbonate ($Li_2CO_3$), lithium hydroxide (LiOH), $LiNO_3$, $CH_3COOLi$, and $Li_2(COO)_2$ may be used.

The nickel cobalt manganese hydroxide precursor, the lithium-containing raw material, and the doping raw material may be mixed in a molar ratio of 0.8:1.5:0.1 to 1.2:1.0:0.0001, preferably 0.9:1.1:0.05 to 1.0:1.0:0.0001, and more preferably 0.9:1.06:0.02 to 1.0:1.02:0.0005. In a case in which the nickel cobalt manganese hydroxide precursor, the lithium-containing raw material, and the doping raw material are mixed within the above molar ratio range, since cation mixing in a positive electrode active material structure may be prevented and a swelling phenomenon due to residual lithium may be prevented, the structural stability may be improved and a positive electrode active material exhibiting excellent capacity characteristics may be prepared. For example, in a case in which the amount of the doping raw material is greater than the above range, this may be a cause of capacity reduction by causing defects in a lithium ion layer and a metal ion layer.

Subsequently, a $Li_{1+x}M^2O_{2+y}$-doped positive electrode active material may be prepared by sintering the mixture subjected to the mixing. Specifically, the sintering may be performed at 700° C. to 1,000° C., for example, 800° C. to 900° C. for 10 hours to 24 hours.

Since the lithium-containing metal oxide represented by Formula 2 is included as the doping raw material included in the positive electrode active material as in the present invention, the doping low material may be uniformly doped in the positive electrode active material due to the high diffusivity of the doping raw material even if the sintering is performed at a temperature lower than a temperature (900° C.) for doping a conventional positive electrode active material, and, thus, a positive electrode active material having excellent structural stability may be prepared. In addition, a battery having improved life characteristics and output characteristics may be provided due to the excellent stability of the positive electrode active material when the positive electrode active material is used in the battery.

Also, the present invention may provide a positive electrode active material which is prepared by the above-described method of preparing a positive electrode active material and is represented by Formula 1 below:

[Formula 1]

In Formula 1, $0 \le x \le 0.1$, $0.6 \le a \le 0.9995$, $0.0005 \le b \le 0.02$, $0.6005 \le a+b < 1$, Me includes at least two selected from the group consisting of cobalt (Co), manganese (Mn), and aluminum (Al), and $M^1$ includes at least one selected from the group consisting of Li, Zr, Ti, Ta, Si, and Nb.

For example, the positive electrode active material may include at least one selected from the group consisting of $LiNi_{0.6}Co_{0.2}Mn_{0.2}Zr_{0.0005}O_2$ and $Li_{1.1}Ni_{0.6}Co_{0.2}Mn_{0.2}Zr_{0.02}O_2$.

Furthermore, provided is a positive electrode for a lithium secondary battery including the positive electrode active material according to the present invention. Specifically, provided is the positive electrode for a lithium secondary battery which includes a positive electrode collector and a positive electrode active material layer formed on the positive electrode collector, wherein the positive electrode active material layer includes the positive electrode active material according to the present invention.

In this case, since the positive electrode active material is the same as described above, detailed descriptions thereof will be omitted, and the remaining configurations will be only described in detail below.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may selectively include a binder as well as a conductive agent, if necessary, in addition to the above-described positive electrode active material.

In this case, the positive electrode active material may be included in an amount of 80 wt % to 99 wt %, for example, 85 wt % to 98.5 wt % based on a total weight of the positive electrode active material layer. When the positive electrode active material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 15 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

$Ni_{0.6}Co_{0.2}Mn_{0.2}(OH)_2$, $Li_2CO_3$, and $Li_2ZrO_3$ were mixed in a ratio of 1:1.05:0.004 and sintered at 850° C. for 10 hours to prepare $Li_{1.05}Ni_{0.6}Co_{0.2}Mn_{0.2}Zr_{0.04}O_2$.

The prepared $Li_2ZrO_3$-doped positive electrode active material, an acetylene black conductive agent, and a polyvinylidene fluoride (PVDF) binder were mixed in a weight ratio of 96:2:2 in an N-methylpyrrolidone (NMP) solvent to prepare a composition for forming a positive electrode. A 10 μm thick aluminum foil was coated with the composition for forming a positive electrode, dried, and then roll-pressed to prepare a positive electrode.

Natural graphite as a negative electrode active material, a carbon black conductive agent, a styrene-butadiene rubber, and carboxymethyl cellulose (CMC) were mixed in a weight ratio of 96.3:1:1.5:1.2 and the mixture was then added to distilled water, as a solvent, to prepare a composition for forming a negative electrode. A 10 μm thick copper foil was coated with the composition for forming a negative electrode, dried, and then roll-pressed to prepare a negative electrode.

After the above-prepared positive electrode and negative electrode were stacked with a polyolefin separator to prepare an electrode assembly, the electrode assembly was put in a battery case, an electrolyte solution, in which 1 M LiPF$_6$ was dissolved in a solvent in which ethylene carbonate and diethyl carbonate were mixed in a ratio of 30:70, was injected thereinto to prepare a lithium secondary battery.

Example 2

A positive electrode active material for a secondary battery and a lithium secondary battery including the same were prepared in the same manner as in Example 1 except that Li$_6$Zr$_2$O$_7$ was used as a doping raw material.

Comparative Example 1

A positive electrode active material for a secondary battery and a lithium secondary battery including the same were prepared in the same manner as in Example 1 except that Ni$_{0.6}$Co$_{0.2}$Mn$_{0.2}$(OH)$_2$ and Li$_2$CO$_3$ were mixed in a ratio of 1:1.05 and sintered at 850° C. for 10 hours to prepare LiNi$_{0.6}$Co$_{0.2}$Mn$_{0.2}$O$_2$ and use it.

Comparative Example 2

A positive electrode active material for a secondary battery and a lithium secondary battery including the same were prepared in the same manner as in Example 1 except that ZrO$_2$ was used as a doping raw material to prepare LiNi$_{0.6}$Co$_{0.2}$Mn$_{0.2}$Zr$_{0.004}$O$_2$.

Experimental Example 1: Life Characteristics and Resistance Characteristics Evaluation Life characteristics and resistance characteristics were measured for each of the lithium secondary batteries prepared in Examples 1 and 2 and Comparative Examples 1 and 2. Specifically, each coin-type battery prepared in Examples 1 and 2 and Comparative Examples 1 and 2 was charged at a constant current of 0.7 C to 4.4 V at 45° C. and cut-off charged at 0.05 C. Thereafter, each coin-type battery was discharged at a constant current of 0.5 C to a voltage of 3.0 V. The charging and discharging behaviors were set as one cycle, and, after this cycle was repeated 100 times, capacity retentions and resistance increase rates of the lithium secondary batteries according to Examples 1 and 2 and Comparative Examples 1 and 2 were measured. A value of the life characteristics was calculated by dividing capacity in a 100$^{th}$ cycle by initial capacity and then multiplying 100, a value of the resistance characteristics was calculated by dividing resistance in the 100$^{th}$ cycle by initial resistance and then multiplying 100, and the results thereof are presented in Table 1 and FIGURE below.

TABLE 1

|  | Life characteristics after 100 cycles at 45° C. (%) | DCIR after 100 cycles at 45° C. (%) |
| --- | --- | --- |
| Example 1 | 94.2 | 111.3 |
| Example 2 | 93.1 | 115.1 |
| Comparative Example 1 | 83.8 | 286.0 |
| Comparative Example 2 | 91.5 | 123.7 |

As illustrated in Table 1 and FIGURE, the lithium secondary batteries respectively prepared in Examples 1 and 2 had capacity retentions of 94.2% and 93.1%, respectively, at a high temperature (45° C.) even after 100 cycles after the preparation of the secondary batteries, wherein it may be confirmed that they exhibited better life characteristics than Comparative Examples 1 and 2.

The lithium secondary batteries prepared in Examples 1 and 2 had resistance increase rates of 111.3% and 115.1%, respectively, with respect to the initial resistance at a high temperature (45° C.). In contrast, the lithium secondary battery prepared in Comparative Example 1 had a resistance increase rate of 286% with respect to the initial resistance at a high temperature, and the lithium secondary battery prepared in Comparative Example 2 had a resistance increase rate of 123.7%. From these results, it may be confirmed that the resistance increase rate at a high temperature of the lithium secondary battery prepared in Example 1 was the lowest.

The invention claimed is:

1. A method of preparing a positive electrode active material, the method comprising:
    mixing a nickel cobalt manganese hydroxide precursor containing nickel in an amount of 60 mol % or more based on a total number of moles of transition metals in the precursor, a lithium-containing raw material, and a compound represented by Formula 2 as a doping raw material; and
    sintering the mixture to prepare a positive electrode active material represented by Formula 1:

    $$Li_{1+x}[Ni_aMe_{1-(a+b)}M^1_b]_{1-x}O_2 \quad [Formula 1]$$

    $$Li_{1+x1}M^2O_{2+y} \quad [Formula 2]$$

wherein, in Formula 1,
    0≤x≤0.1, 0.6≤a≤0.9995, 0.0005≤b≤0.01, 0.6005≤a+b<1, Me comprises at least two selected from the group consisting of cobalt (Co), manganese (Mn), and aluminum (Al), and M$^1$ comprises at least one selected from the group consisting of lithium (Li), zirconium (Zr), titanium (Ti), tantalum (Ta), silicon (Si), and niobium (Nb), and
    wherein, in Formula 2,
    0≤x1≤7, 1≤y<6, and M$^2$ comprises at least one selected from the group consisting of Li, Zr, Ti, Ta, Si, and Nb.

2. The method of claim 1, wherein the nickel cobalt manganese hydroxide precursor is Ni$_{a1}$Co$_{b1}$Mn$_{c1}$(OH)$_2$ (where 0.6≤a1≤0.95, 0≤b1≤0.2, and 0<c1≤0.2).

3. The method of claim 1, wherein the doping raw material comprises at least one selected from the group consisting of Li$_2$ZrO$_3$, Li$_6$Zr$_2$O$_7$, Li$_8$ZrO$_6$, LiTiO$_3$, LiTaO$_3$, Li$_2$Si$_5$O$_7$, Li$_2$Si$_5$O$_7$, and LiNbO$_3$.

4. The method of claim 1, wherein the nickel cobalt manganese hydroxide precursor, the lithium-containing raw material, and the doping raw material are mixed in a molar ratio of 0.8:1.5:0.1 to 1.2:1.0:0.0001.

5. The method of claim 1, wherein the sintering is performed at 700° C. to 1,000° C.

\* \* \* \* \*